(12) United States Patent
Tiwari et al.

(10) Patent No.: US 10,200,750 B2
(45) Date of Patent: *Feb. 5, 2019

(54) CUSTOMER PREMISE EQUIPMENT (CPE) AND SET TOP BOX QUALITY CONTROL TEST SYSTEM PROVIDING SCALABILITY AND PERFORMANCE

(71) Applicant: Contec, LLC, Schenectady, NY (US)

(72) Inventors: Rajeev Tiwari, San Jose, CA (US); Rafael Villanueva, Clifton Park, NY (US); Vladzimir Valakh, Troy, NY (US)

(73) Assignee: Contec, LLC, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,801

(22) Filed: Nov. 21, 2017

(65) Prior Publication Data

US 2018/0077454 A1 Mar. 15, 2018

Related U.S. Application Data

(63) Continuation of application No. 15/220,235, filed on Jul. 26, 2016, now Pat. No. 9,872,070.

(51) Int. Cl.
| | | |
|---|---|---|
| *H04N 21/439* | (2011.01) | |
| *H04N 21/442* | (2011.01) | |
| *H04N 21/44* | (2011.01) | |
| *H04N 21/485* | (2011.01) | |
| *H04N 21/8543* | (2011.01) | |
| *H04N 21/438* | (2011.01) | |
| *H04N 21/61* | (2011.01) | |
| *A63F 13/00* | (2014.01) | |

(52) U.S. Cl.
CPC ....... *H04N 21/44209* (2013.01); *A63F 13/00* (2013.01); *H04N 21/4383* (2013.01); *H04N 21/44008* (2013.01); *H04N 21/485* (2013.01); *H04N 21/6118* (2013.01); *H04N 21/6125* (2013.01); *H04N 21/8543* (2013.01)

(58) Field of Classification Search
CPC ............................................. H04N 21/44209
See application file for complete search history.

(56) References Cited

U.S. PATENT DOCUMENTS

| | | |
|---|---|---|
| 7,664,317 B1 | 2/2010 | Sowerby |
| 8,418,219 B1 | 4/2013 | Parsons |
| 9,848,233 B1 | 12/2017 | Tiwari et al. |

(Continued)

FOREIGN PATENT DOCUMENTS

| | | |
|---|---|---|
| WO | 2014105094 | 7/2014 |
| WO | 2014105095 | 7/2014 |
| WO | 2014105096 | 7/2014 |

OTHER PUBLICATIONS

Tiwari, Rajeev; First Action Interview Pilot Program Pre-Interview Communication for U.S. Appl. No. 15/220,278, filed Jul. 26, 2016, dated May 11, 2018, 19 pgs.

(Continued)

*Primary Examiner* — Nasser M Goodarzi
*Assistant Examiner* — Adil Ocak
(74) *Attorney, Agent, or Firm* — Taylor English Duma LLP

(57) ABSTRACT

A test system for testing a plurality of end-user devices. A controller performs pre-provision verification, provisioning, and post-provision testing. Pre-provision verification can be performed on a subset of end-user devices while others are bring provisioned.

18 Claims, 13 Drawing Sheets

(56) References Cited

U.S. PATENT DOCUMENTS

| | | |
|---|---|---|
| 9,872,070 B1 | 1/2018 | Tiwari et al. |
| 2004/0128652 A1 | 7/2004 | Mandava |
| 2005/0183130 A1 | 8/2005 | Sadja |
| 2009/0089854 A1 | 4/2009 | Le |
| 2009/0282446 A1 | 11/2009 | Breed |
| 2009/0282455 A1 | 11/2009 | Bell et al. |
| 2010/0071053 A1 | 3/2010 | Ansari et al. |
| 2012/0140081 A1 | 1/2012 | Clements |
| 2013/0024880 A1 | 1/2013 | Moloney-Egnatios |
| 2013/0104158 A1 | 4/2013 | Partee |
| 2014/0187173 A1 | 7/2014 | Partee |
| 2017/0048519 A1 | 2/2017 | Friel |
| 2018/0077448 A1 | 3/2018 | Tiwari et al. |

OTHER PUBLICATIONS

Tiwari, Rajeev; Non-Final Office Action for U.S. Appl. No. 15/812,186, filed Nov. 14, 2017, dated May 30, 2018, 34 pgs.

Tiwari, Rajeev; Applicant Initiated Interview Summary for U.S. Appl. No. 15/220,259, filed Jul. 26, 2016, dated Nov. 1, 2017, 2 pgs.

Tiwari, Rajeev; Corrected Notice of Allowance for U.S. Appl. No. 15/220,259, filed Jul. 26, 2016, dated Nov. 6, 2017, 9 pgs.

Tiwari, Rajeev; First Action Interview Pilot Program Pre-Interview Communication for U.S. Appl. No. 15/220,259, filed Jul. 26, 2016, dated Jun. 8, 2017, 5 pgs.

Tiwari, Rajeev; Issue Notification for U.S. Appl. No. 15/220,259, filed Jul. 26, 2016, dated Nov. 29, 2017, 1 pg.

Tiwari, Rajeev; Notice of Allowance for U.S. Appl. No. 15/220,259, filed Jul. 26, 2016, dated Aug. 18, 2017, 12 pgs.

Tiwari, Rajeev; Notice of Allowance for U.S. Appl. No. 15/220,259, filed Jul. 26, 2016, dated Sep. 28, 2017, 14 pgs.

Tiwari, Rajeev; Corrected Notice of Allowance for U.S. Appl. No. 15/220,235, filed Jul. 26, 2016, dated Dec. 13, 2017, 6 pgs.

Tiwari, Rajeev; Issue Notification for U.S. Appl. No. 15/220,235, filed Jul. 26, 2016, dated Dec. 27, 2017, 1 pg.

Tiwari, Rajeev; Non-final Office Action for U.S. Appl. No. 15/220,235, filed Jul. 26, 2016, dated May 17, 2017, 18 pgs.

Tiwari, Rajeev; Notice of Allowance for U.S. Appl. No. 15/220,235, filed Jul. 26, 2016, dated Sep. 29, 2017, 14 pgs.

Tiwari, Rajeev; Response to Amendment under Rule 312 for U.S. Appl. No. 15/220,235, filed Jul. 26, 2016, dated Nov. 10, 2017, 2 pgs.

Businesswire; Article entitled: "GENBAND and CTDI Settle Legal Dispute", located at <http://www.businesswire.com/news/home/20140321005528/en/GENBAND-CTDI-Settle-Legal-Dispute>, Mar. 21, 2014, 1 pg.

CED Magazine; Article entitled: "Cable Connects in Atlanta", located at <https://www.cedmagazine.com/article/2006/04/cable-connects-atlanta>, Apr. 30, 2006, 21 pgs.

Consumer Electronics Net; Article entitled: "Teleplan Enhances Test Solution Portfolio with Titan", located at <http://www.consumerelectronicsnet.com/article/Teleplan-Enhances-Test-Solution-Portfolio-With-Titan-4673561>, published on Nov. 1, 2016, 3 pgs.

Digital Producer; Article entitled: "S3 Group Unveils Exclusive Partnership in North America With First US StormTest(TM) Decision Line Customer", located at <http://www.digitalproducer.com/article/S3-Group-Unveils-Exclusive-Partnership-in-North-America-With-First-US-StormTest(TM)-Decision-Line-Customer--1668213>, Sep. 8, 2011, 3 pgs.

Electronic Design; Article entitled: "Testing of MPEG-2 Set-Top Boxes Must be Fast, Thorough", located at <http://www.electronicdesign.com/print/839>, published Nov. 18, 2001, 9 pgs.

Euromedia; Article entitled: "Automated TV Client testing: Swisscom partners with S3 Group to deliver the ultimate IPTV experience", located at <http://advanced-television.com/wp-content/uploads/2012/10/s3.pdf>, earliest known pub. date—May 30, 2013, 2 pgs.

Exact Ventures; Report entitled: North American Telecommunications Equipment Repair Market, located at http://www.fortsol.com/wp-content/uploads/2016/08/Exact-Ventures-NA-Repair-Market-Report.pdf>, earliest known publication date Aug. 1, 2016, 12 pgs.

Promptlink Communications; Article entitled: "Promptlink Communications Officially Launches Sep-Top Box Testing Platform", located at <https://www.promptlink.com/company/assets/media/2014-05-20.pdf>, published on May 20, 2014, 2 pgs.

Promptlink; Article entitled: "Cable Modem Test Platform", located at <https://www.promptlink.com/products/cmtp.html>, earliest known publication date Aug. 11, 2016, 10 pgs.

Promptlink; Article entitled: "Set-Top Box Test Platform", located at <http://promptlink.com/products/stbtp.html>, earliest known publication date Aug. 11, 2016, 7 pgs.

S3 Group; Document entitled: "White Paper: The Importance of Automated Testing in Set-Top Box Integration", earliest known publication date Jun. 17, 2014, 11 pgs.

Teleplan; Article entitled: "Screening & Testing", located at <https://www.teleplan.com/innovative-services/screening-testing/>, earliest known publication date Mar. 21, 2015, 7 pgs.

TVTechnology; Article entitled: "S3 Group's StormTest", located at <http://www.tvtechnology.com/expertise/0003/s3-groups-stormtest/256690>, published May 1, 2012, 2 pgs.

Tiwari, Rajeev; Notice of Allowance for U.S. Appl. No. 15/220,278, filed Jul. 26, 2016, dated Sep. 6, 2018, 13 pgs.

Tiwari, Rajeev; Notice of Allowance for U.S. Appl. No. 15/812,186, filed Nov. 14, 2017, dated Nov. 15, 2018, 13 pgs.

CUSTOMER PREMISE EQUIPMENT (CPE) AND SET TOP BOX QUALITY CONTROL TEST SYSTEM PROVIDING SCALABILITY AND PERFORMANCE

CROSS-REFERENCE

This application is a continuation of U.S. patent application Ser. No. 15/220,235, filed Jul. 26, 2016 which is hereby incorporated by reference in its entirety.

BACKGROUND

In a typical prior-art quality test system for end-user devices such as set top boxes and game consoles, multiple units under test (UUT) are coupled to multiple media-test boards. The media-format boards (MFTs) may each offer a set of media format conversion functionality. The connectivity employed between a particular UUT and its associated MFB may vary according to the make and model of the UUT and or MFB. Some UTTs may receive signals which are not directed from or through the MFB with which they are associated, for example signals from a service provider head-end. The inputs to a MFB, UUT, and the connections between an MFB and UUT, may vary according to the make and model of UUT, complicating the testing process.

Polling, control, initialization, and configuration signals are typically provided by the service provider (e.g., a cable television network operator, an Internet Service Provider, etc.) to the UUT and are supplied via a direct connection between the UUT and the service provider network. In order to swap a UUT with another for testing purposes, it may be necessary to manually reconfigure the connections between the UUT and the MFB, and the UUT and the service provider.

Each MFB may be coupled to test logic (e.g. a laptop computer), for example via a Universal Serial Bus (USB). Each MFB may drive an infrared (IR) signal source to control the UUT. A USB hub may be employed to expand the number of ports available on a laptop, personal computer, or other test device.

These conventional test system tend to suffer from poor performance and lack of scalability.

BRIEF SUMMARY

Disclosed herein are a machine architecture implementing a staging automation process, including features such as multiple IR transmitters and composite video inputs for automated high volume quality testing. Diagnostic display outputs from a unit under test are input to OCR and video quality algorithms to validate that the units under test are ready for a functional test process at the next stage. Units under test having DOCSIS capability (DSG) are manipulated using, for example, an SNMP protocol, replacing OCR. Communication is carried out through a DSG channel from a main controller to the unit under test for diagnostic information retrieval and request of command execution by the unit under test.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
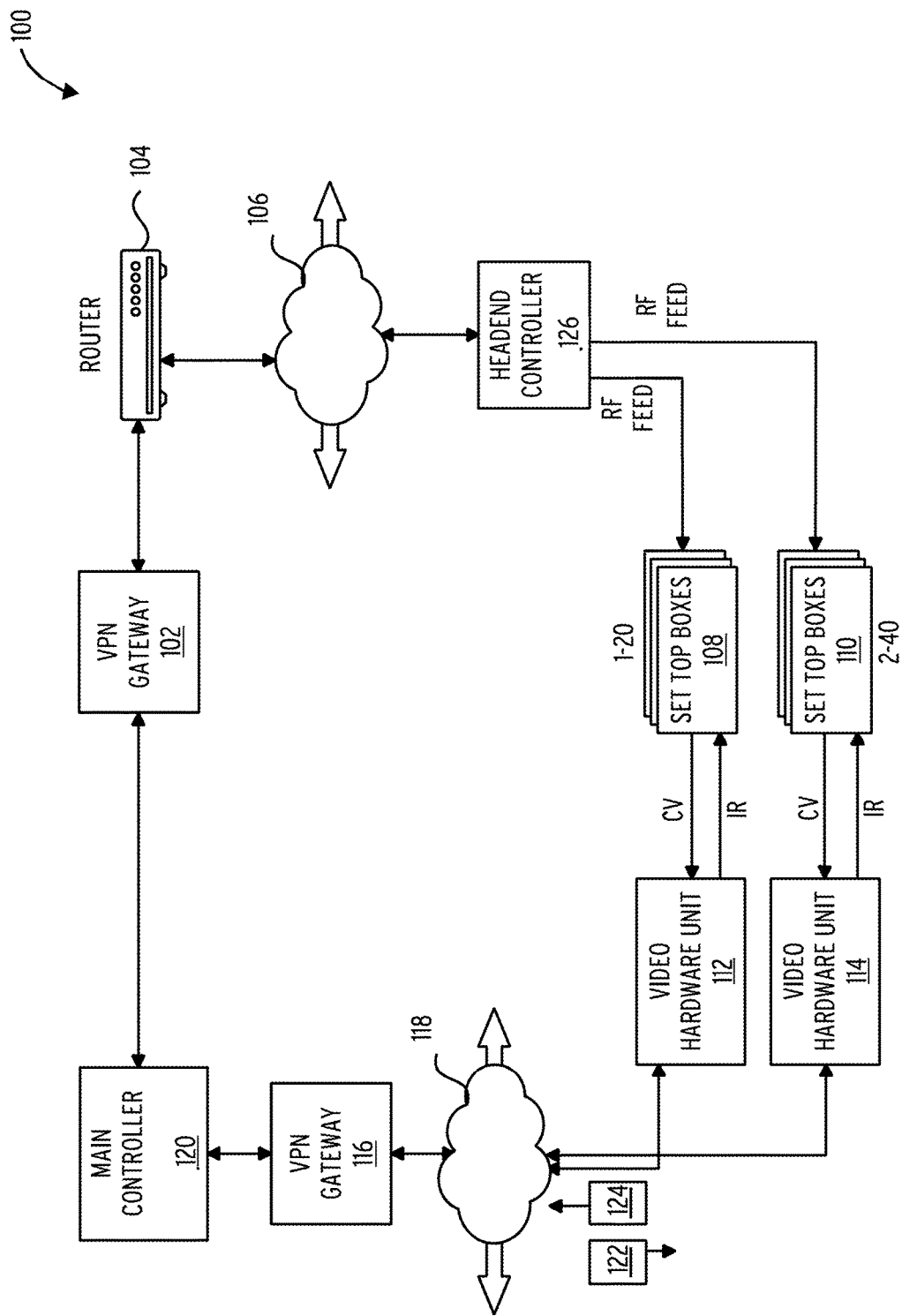
FIG. 1 illustrates a distributed quality test system 100 in accordance with one embodiment.

Systems and processes are described herein to execute verifications of units under test (e.g., set top boxes) prior to provisioning of the units under test by a headend controller. Verifications may include one or more of power detection, boot detection, RF out of band (00B) health status, and a conditional access security check. One or more of these verifications (e.g., the conditional access security check) may vary according to the manufacturer of the unit under test (e.g., Motorola and Pace use Unit Address, Cisco uses MAC).

Units under test (UUT) that do not pass the verifications are suppressed from proceeding to an initialization and code download stage (provisioning) from a headend main controller. A result is reduced latency time for provisioning the UUTs that pass verification.

The system utilizes concurrent processing in a temporal overlap interval to detect intermittent failures exhibited during a UUT warm-up phase and/or pre-provisioning phase that overlaps with a provisioning phase within a set of UUTs. Examples of warm-up phase failures that may be detected are unit reboots, video tiling, in band (IB) tuner corrected and uncorrected byte and/or block increases, and loss of provisioning stability.

Disclosed herein are embodiments of an analytic system for testing a large number of units under test (UUTs). The analytic system includes a rack system having multiple testing units (sometimes referred to herein as video hardware units) and UUTs. Each of the testing units receives video inputs from a corresponding different subset of the UUTs and outputs infra-red commands to the corresponding different subset of the UUTs to drive quality testing of the UUTs. Each of the testing units executes in parallel a pre-provisioning phase, a provisioning phase, and a post-provisioning phase on subsets of the UUTs, and reconfigures the infra-red commands to the UUTs and the video inputs from the UUTs in response to results of the pre-provisioning and provisioning phases.

Each of the testing units receives via the rack system a UUT test from a master control remote from the rack system (e.g., a web server system). Each of the testing units returns via the rack system UUT test results to the master control. The master control interoperates with a cable system headend to communicate the UUT test and to receive the UUT test result via a web server system.

The testing units may operate the provisioning phase on a first subset of the UUTs in parallel with operating the post-provisioning phase on a second subset of the UUTs. In one embodiment, the testing units each include video processors each configured to receive at least ten individual composite video inputs, and the testing units are each coupled to an infra-red driver board with at least ten individual infra-red outputs. The infra-red driver board may also control a tower lamp for the rack system.

The rack system distributes radio frequency video from the cable system headend to each of the UUTs via a master RF splitter coupled to a plurality of domain-level RF splitters on different levels of the rack system. The master RF splitter may be controlled by a master video test unit that also coordinates testing of the UUTs among the various other (subservient) test units.

Referring to FIG. 1, a distributed quality test system 100 comprises a main controller 120 acting as a master control for a plurality of slave controllers, e.g. video hardware unit 112 and video hardware unit 114. The main controller 120 also controls a headend controller 126 to drive RF audio and video (AV) feeds to the set top boxes 108 and set top boxes 110. The video hardware unit 112 and video hardware unit 114 control groups of UUTs, e.g. set top boxes 108 and set top boxes 110. In response to infrared (IR) controls from the video hardware unit 112 and video hardware unit 114, the set top boxes 108 and set top boxes 110 each drive composite video (CV) to the video hardware unit 112 and video hardware unit 114, respectively.

The main controller 120 interacts with the video hardware unit 112 and the video hardware unit 114 through a subsystem that includes a VPN gateway 116 and a VLAN 118. The main controller 120 communicates UUT test 122 to the video hardware unit 112 and to the video hardware unit 114, and the UUT test 122 receives test results 124 from the video hardware unit 112 and the video hardware unit 114. The main controller 120 interacts with the headend controller 126 through a subsystem that includes a VPN gateway 102, a router 104, and a VLAN 106.

In one embodiment the main controller 120 is implemented as a Django framework. The main controller 120 configures and stores one or more UUT test 122. The UUT test 122 may be one or more sets of sequential operational tests each for a specific UUT type or a test framework for a UUT family. The main controller 120 may operate as a message broker that communicates the UUT test 122 to the video hardware unit 112 and the video hardware unit 114. The main controller 120 may also monitor the state of operation of the video hardware unit 112 and the video hardware unit 114, for example by applying controls requesting the current status of ongoing tests. The main controller 120 may also poll to determine the presence of the test results 124 at a predetermined location, for example, in a shared file system folder of the server test system 404.

The current status of ongoing tests by the video hardware unit 112 and video hardware unit 114 on the set top boxes 108 and the set top boxes 110 may be displayed in a web graphical user interface by the main controller 120. The main controller 120 may also control a tower lamp 506 to inform human operators of the status of the tests on the UUT's in the quality test rack 500.

The main controller 120 may communicate with the video hardware unit 112 and video hardware unit 114 using HTTP packets. Each packet may comprise a single command that complies with a predefined schema and format.

Figure 2:
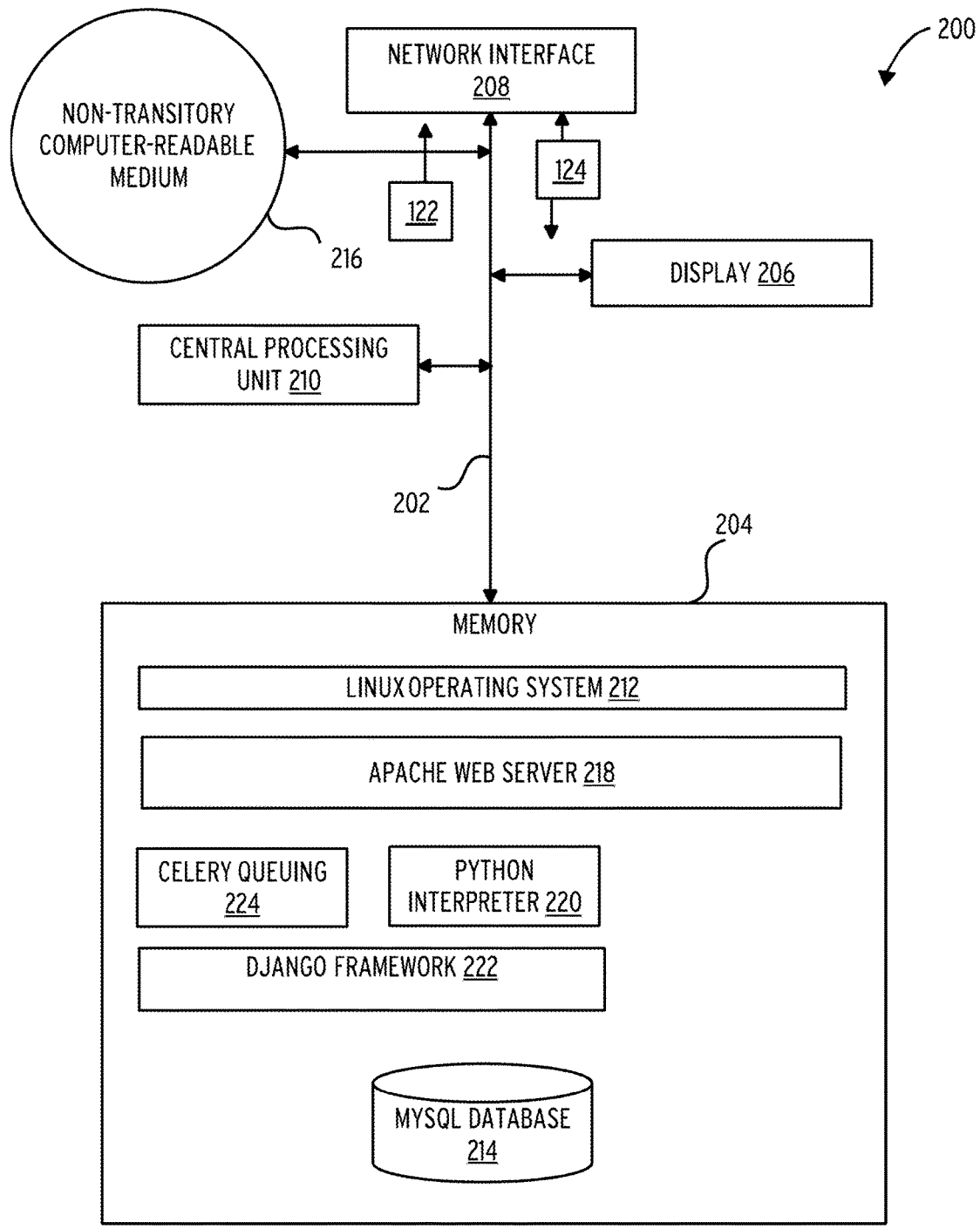
FIG. 2 illustrates a main controller 200 in accordance with one embodiment.

FIG. 2 illustrates components of an exemplary main controller 200 (e.g., main controller 120) in accordance with one embodiment. In various embodiments, main controller 200 may include a server, workstation, server farm, or other computing device or devices designed to perform operations such as those described herein. In some embodiments, main controller 200 may include many more components than those shown in FIG. 2. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, main controller 200 may comprise one or more physical and/or logical devices that collectively provide the functionalities described herein. In some embodiments, main controller 200 may comprise one or more replicated and/or distributed physical or logical devices.

In some embodiments, main controller 200 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Main controller 200 includes a bus 202 interconnecting several components including a network interface 208, a display 206, a central processing unit 210, and a memory 204. The test results 124 may be output to the display 206, and may also be communicated to remove devices via the network interface 208, for example to mobile field test devices or mobile devices of authorized users of the main controller 200.

Memory 204 generally comprises a random access memory ("RAM") and permanent non-transitory mass storage device, such as a hard disk drive or solid-state drive. Memory 204 stores a Linux operating system 212.

These and other software components may be loaded into memory 204 of main controller 200 using a drive mechanism (not shown) associated with a non-transitory computer-readable medium 216, such as a floppy disc, tape, DVD/CD-ROM drive, memory card, or the like.

Memory 204 also includes MySQL database 214. In some embodiments, server 200 (deleted) may communicate with MySQL database 214 via network interface 208, a storage area network ("SAN"), a high-speed serial bus, and/or via the other suitable communication technology.

In some embodiments, MySQL database 214 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 3:
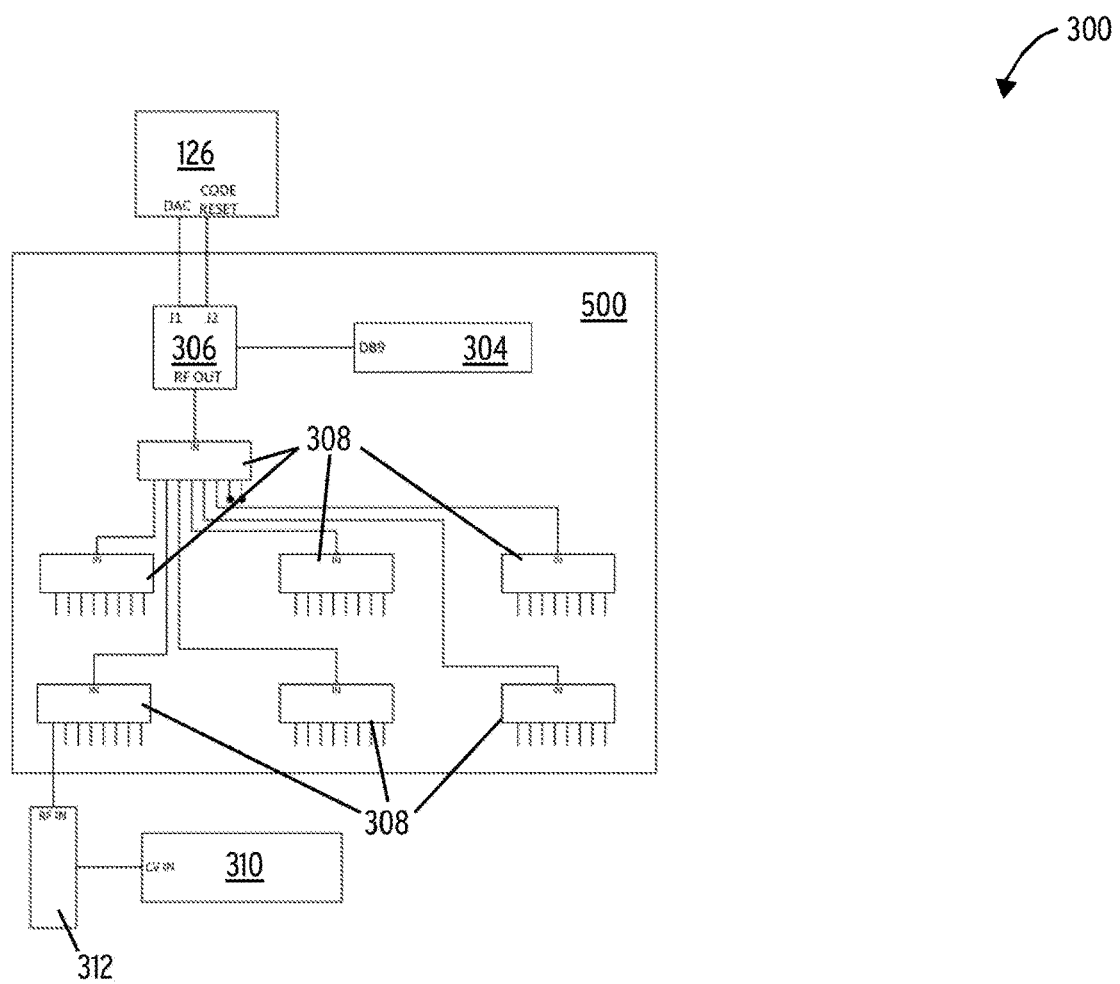
FIG. 3 illustrates a test system 300 in accordance with one embodiment.

Referring to FIG. 3, a test system 300 includes a quality test rack 500 coupled to a headend controller 126 and many set top boxes. One set top box (set top box 312) is illustrated, but many dozens (e.g., 40 or so) may be tested simultaneously by the test system 300.

The quality test rack 500 comprises a main video hardware unit 304, an RF switch 306, and many RF splitters 308.

A human operator may install the units under test on the quality test rack 500 (e.g., up to 40), connect cables (e.g., power cables, RF input cables, and composite video cables). The human operator may also scan bar codes labels on the unit under test (e.g., for a particular product code) before initiating a pre-provisioning verification processing stage.

Figure 4:
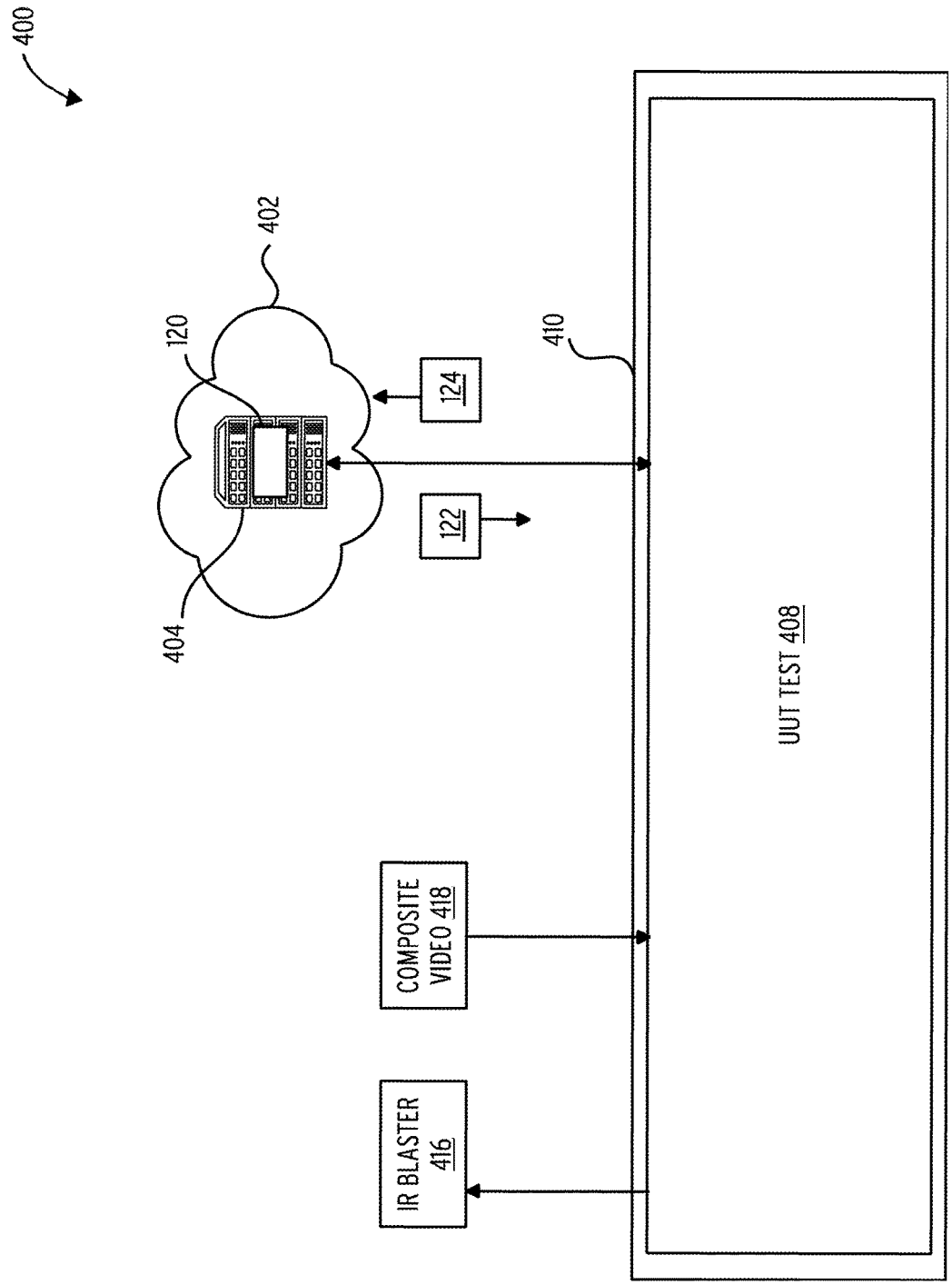
FIG. 4 illustrates a distributed quality test system 400 in accordance with one embodiment.

Referring to FIG. 4, a distributed quality test system 400 includes a server test system 404 and a video hardware unit 410 that interoperate with one another over the Internet 402. More particularly, an embedded test module 408 of the video hardware unit 410 interoperates with a main controller 120 of the server test system 404. The main controller 120 may comprise a web application and web user interface.

The server test system 404 communicates a UUT test 122 to the embedded test module 408. The embedded test module 408 applies the UUT test 122 to analyze composite video 418 received from multiple units under test, and to operate an IR blaster 416 to operate the units under test. Results of applying the UUT test 122 are communicated by the embedded test module 408 to the main controller 120.

By way of example, the main controller 120 may be implemented using an Apache web server with a web user interface to display status and results encoded by the test results 124. The UUT test 122 and test results 124 may be XML files or direct controls exchanged using TCP/IP sockets.

An embodiment of a schema for the UUT test 122 is:
1. XML declaration.
2. Root element with unique name "RACKTEST"
3. A following element "COMMON" including parameters common to all tests.
   "FileFormat"—a unique name (associate number, currently=1) for the XML control format.
   "UnitType"—the make of the UUT types that will be tested. Supported values are: MOT, CISCO, PACE, TiVo.
   "SerialNumbers"—a list of UUT serial numbers separated by commas ",". The count of serials must match the count of UUTs installed for testing on the quality test rack 500.
4. A following element "TESTING". It can include any numbers of elements having type "TEST" or having type "COMMAND".

Elements having type "COMMAND" are action commands. Examples of commands are:
   "Sleep"—delay in milliseconds before execution of next test/command
   "SendIRCode"—send IR command to the unit/units.
   "SendIRChannel"—send sequence of IR digits encoding a channel number.

Elements having type "TEST" define tests to execute on the UUTs. Each element of type "TEST" has an attribute "name" and some additional parameters. Parameters can comprise values to control the execution of the test.
   "Channel"—a tuner channel number on which the test will be performed.
   "Page"—a name and/or number of a diagnostic page from which information will be read.
   "Left", "Top", "Right", "Bottom"—a numbers of pixels and/or lines to extract from video or images frames of the composite video.

Example tests that may be supported include CheckCompositePresence, EnterDiagPage, GetFrameText, InitVerification, GetPageText.

The following is an example UUT test 122 for a CheckCompositePresence test for a UUT:

```
<?xml version="1.0" encoding="ISO-8859-1"?>
<RACKTEST>
<COMMON>
<FileFormat>1</FileFormat>
<UnitType>MOT</UnitType>
<SerialNumbers>A1234567, B1234567</SerialNumbers>
</COMMON>
<TESTING>
<TEST name="CheckCompositePresence">
</TEST>
</TESTING>
</RACKTEST>
```

The following is a UUT test 122 example for a live DVR test:

```
<?xml version="1.0" encoding="ISO-8859-1"?>
<RACKTEST>
<COMMON>
<FileFormat>1</FileFormat>
<UnitType>MOT</UnitType>
<SerialNumbers>A1234567,B1234567,C1234567,D1234567,E1234567,
F1234567,G1234567</SerialNumbers>
<RepeatCount>20</RepeatCount>
</COMMON>
<TESTING>
<COMMAND name = "SendIRChannel">
<Channel>400</Channel>
</COMMAND>
<COMMAND name = "Sleep">
<Time>3000</Time>
</COMMAND>
<TEST name = "LiveDVR">
<Channel>400</Channel>
</TEST>
</TESTING>
</RACKTEST>
```

The following example UUT test 122 will place a UUT in diagnostics mode, navigate to a specific page, and read info from that page:

```
<?xml version="1.0" encoding="ISO-8859-1"?>
<RACKTEST>
<COMMON>
<FileFormat>1</FileFormat>
<UnitType>MOT</UnitType>
<SerialNumbers>A1234567,A1234567</SerialNumbers>
<UnitEnable>1,1</UnitEnable>
</COMMON>
<TESTING>
<TEST name = "GetPageText">
<Channel>255</Channel>
<Page>1</Page>
<EnterDiagMode>1</EnterDiagMode>
<Left>20</Left>
<Top>40</Top>
<Right>650</Right>
<Bottom>260</Bottom>
</TEST>
</TESTING>
</RACKTEST>
```

The test results 124 may have the following control schema:
1. A root element named "RACKTEST_RESULTS". This may have the following sections:
   "SUMMARY"—includes information about passed and failed tests.
   "DETAILED"—provides details for passed/failed units.

The following is an example test results 124 returned from the EnterDiagPage UUT test 122:

```xml
<?xml version="1.0" encoding="ISO-8859-1"?>
<RACKTEST_RESULTS>
<SUMMARY>
<UNIT SN = "A1234567">
<Passed>1</Passed>
<Failed>0</Failed>
</UNIT>
<UNIT SN = "2">
<Passed>1</Passed>
<Failed>0</Failed>
</UNIT>
</SUMMARY>
<DETAILED>
<TEST name = "EnterDiagPage">
<UNIT SN = "A1234567">Passed</UNIT>
<UNIT SN = "2">Passed</UNIT>
</TEST>
</DETAILED>
</RACKTEST_RESULTS>
```

The following is an example test results 124 returned by the GetPageText UUT test 122:

```xml
<?xml version="1.0" encoding="ISO-8859-1"?>
<RACKTEST_RESULTS>
<SUMMARY>
<UNIT SN = "A1234567">
<Passed>0</Passed>
<Failed>1</Failed>
</UNIT>
<UNIT SN = "B1234567">
<Passed>1</Passed>
<Failed>0</Failed>
</UNIT>
</DETAILED>
<RESULTS>
<TEST name = "GetPageText">
<UnitB1234567>
GENERAL STATUS
ERROR: EP00 CONNECTED DES
PLATFORM ID: 0x0804
MAPPED PLATFORMID: 0x0804
FAMILY ID: 0x0028
MODEL ID: 0xEA08
REMOD CHANNEL: 04
SETTOP LOCAL TIME: ?an 22 2016 13:39:01
DST ACTIVE: NO
STD TIME OFFSET: GMT-05:00
DST ENTRY TIME: Apr 03 2016 07:00:00 GMT
DST EXIT TIME: Oct 30 2016 06:00:00 GMT
CURRENT GPS TIME: ?an 22 2016 18:39:01 GMT
COUNTRY CODE: USA, 1, UNITED STATES
TOTAL RUN TIME: 429H 17M
STANDBY TIME %: 19%
LOW POWER TIME %: 1%
</TEST>
</RESULTS>
</RACKTEST_RESULTS>
```

Figure 5:
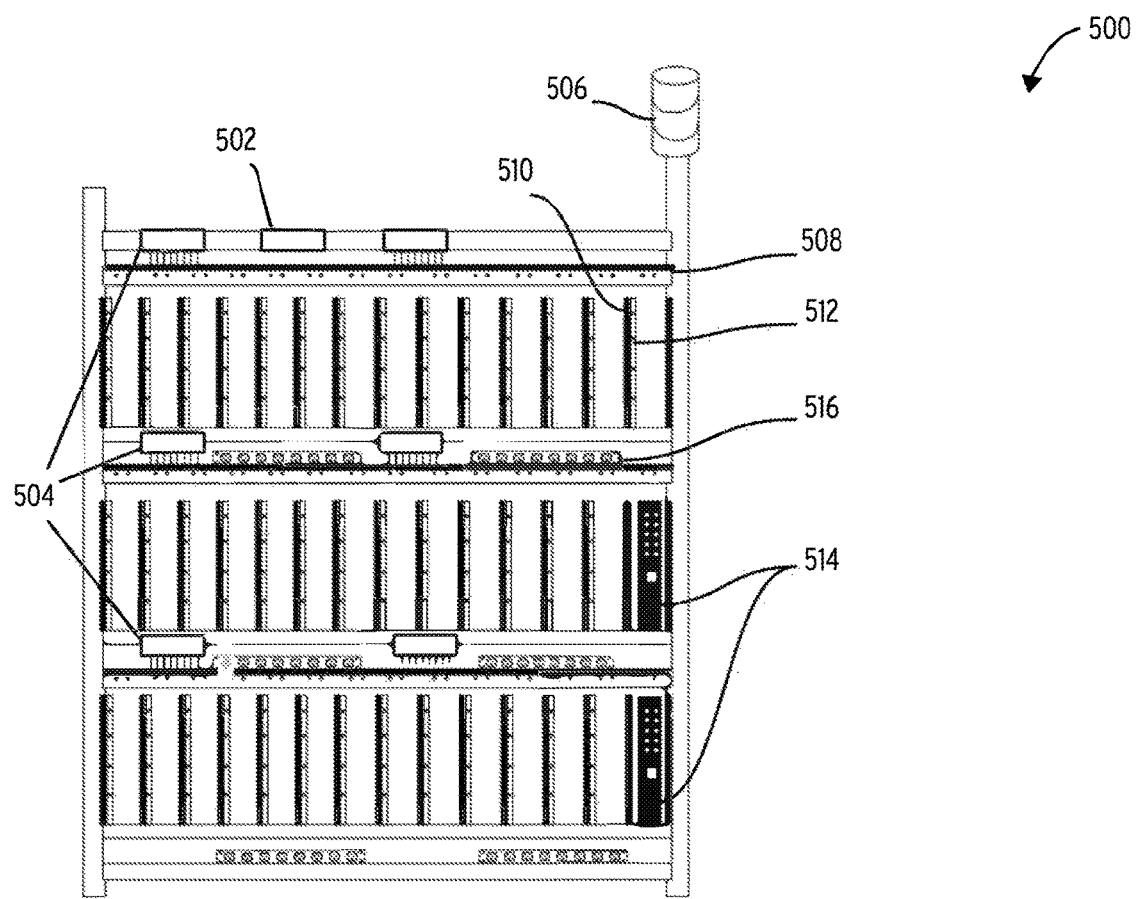
FIG. 5 illustrates first view of a quality test rack 500 in accordance with one embodiment.

Referring to FIG. 5, a quality test rack 500 embodiment includes a main RF splitter 502, an 8×1 RF splitter 504, a tower lamp 506, an RF bundle 508, an IR blaster 510, a slot wall 512, a video hardware boxes 514, and a power strip 516. The quality test rack 500 may include other features as well, which are either illustrated in other drawings or which are well known and/or not necessary to this explanation.

Figure 6:
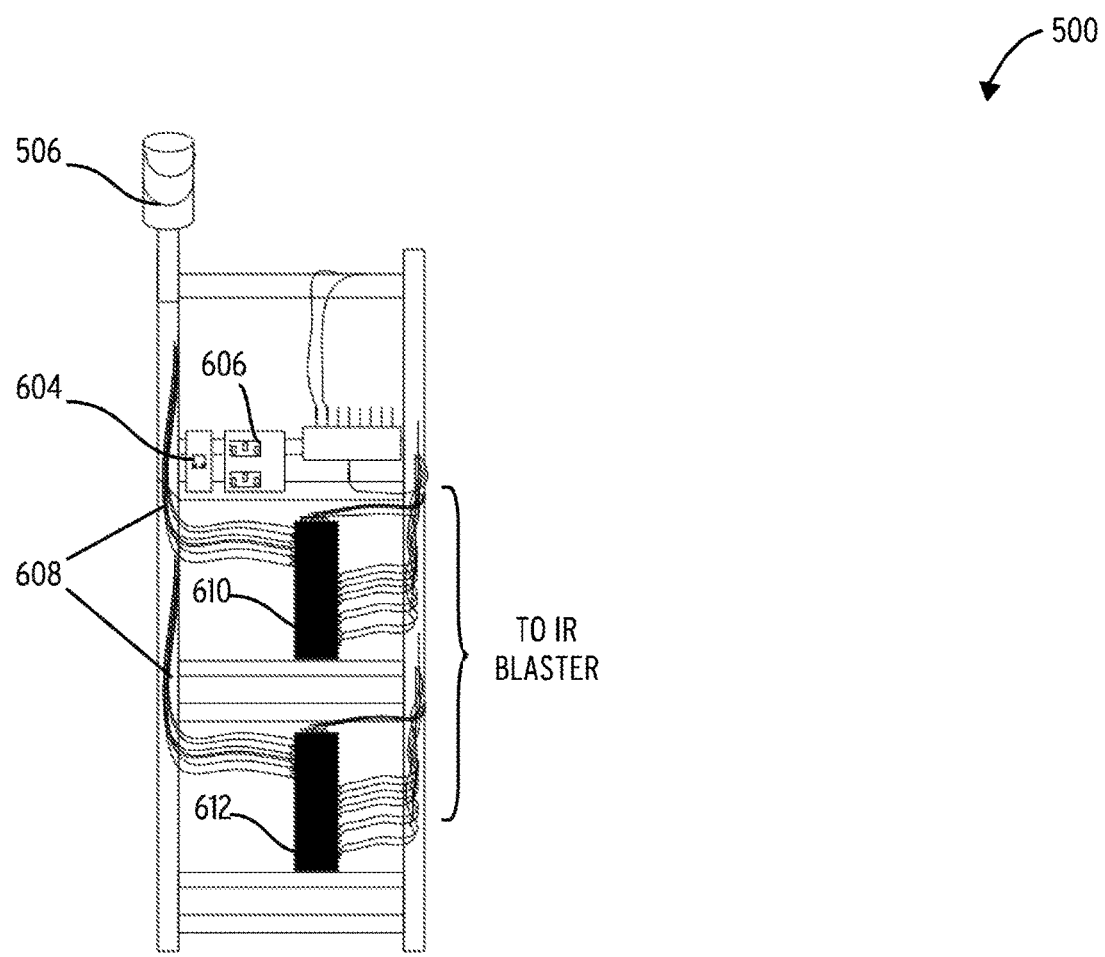
FIG. 6 illustrates a second view of a quality test rack 500 in accordance with one embodiment.

Referring to FIG. 6, the quality test rack 500 may further comprise a LAN connector 604, a main power connector 606, CV cables 608, a head video unit 610, and a video unit 612. Cables from the head video unit 610 and the video unit 612 form connections to one or more IR blaster 510.

Figure 7:
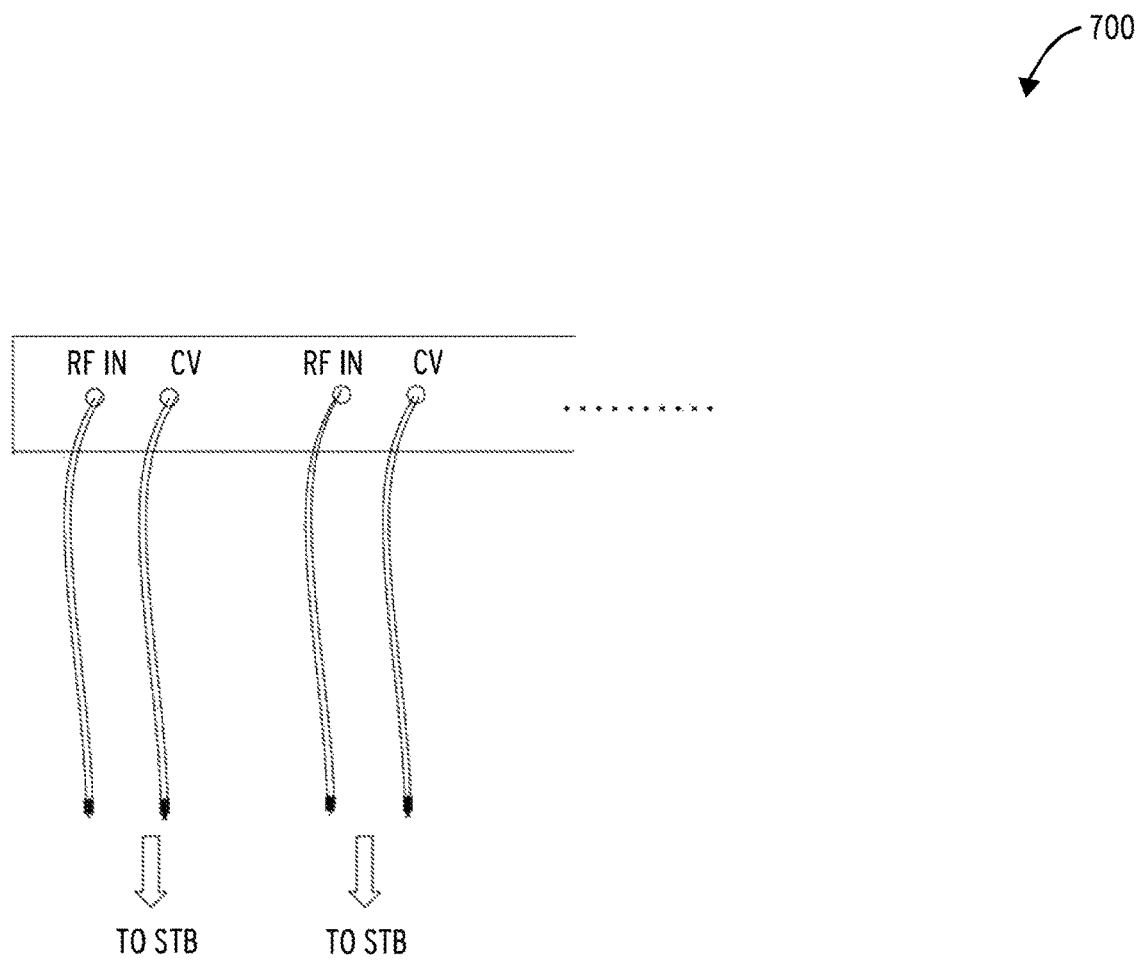
FIG. 7 illustrates a panel section 700 in accordance with one embodiment.

Referring to FIG. 7, a panel section 700 may comprise RF input cables and CV cables to multiple set top boxes.

Figure 8:
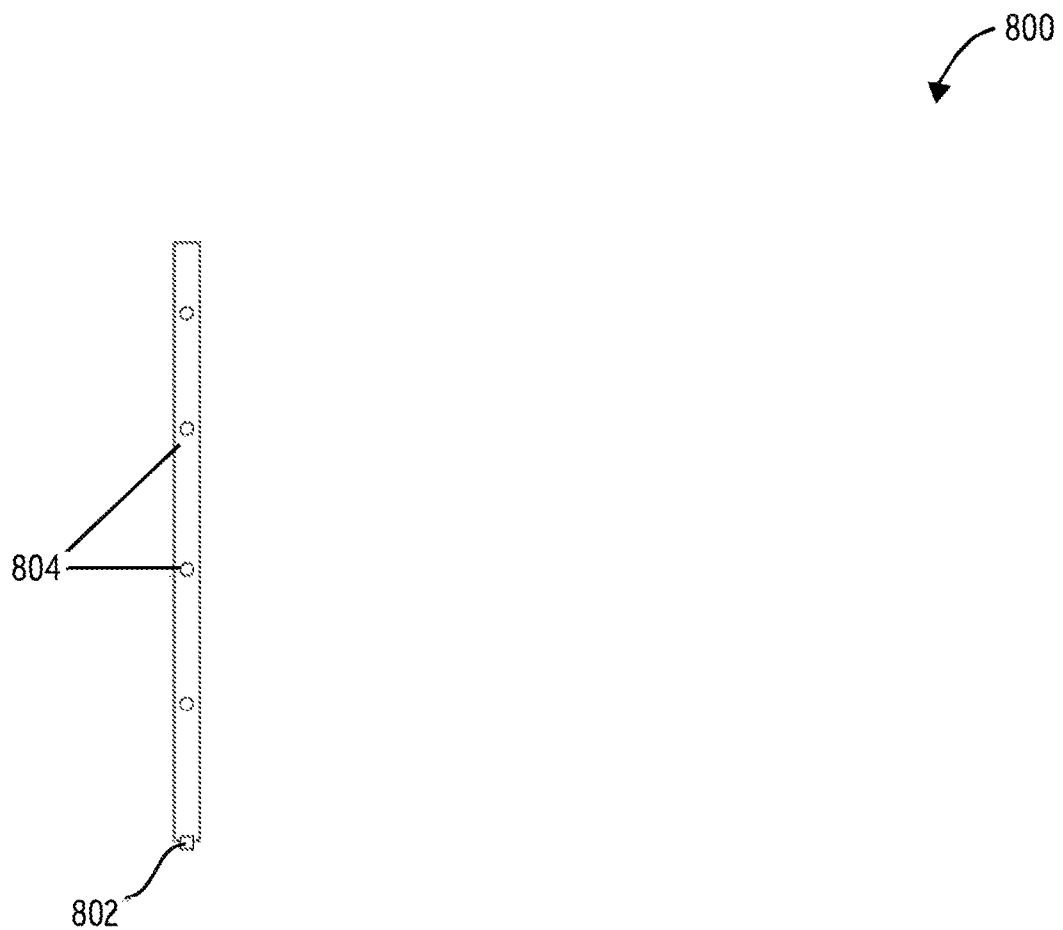
FIG. 8 illustrates an IR blaster 800 in accordance with one embodiment.

Referring to FIG. 8, an IR blaster comprises IR LEDs 804 and a connector 802, which may be a 3.5 mm connector in some implementations.

Figure 9:
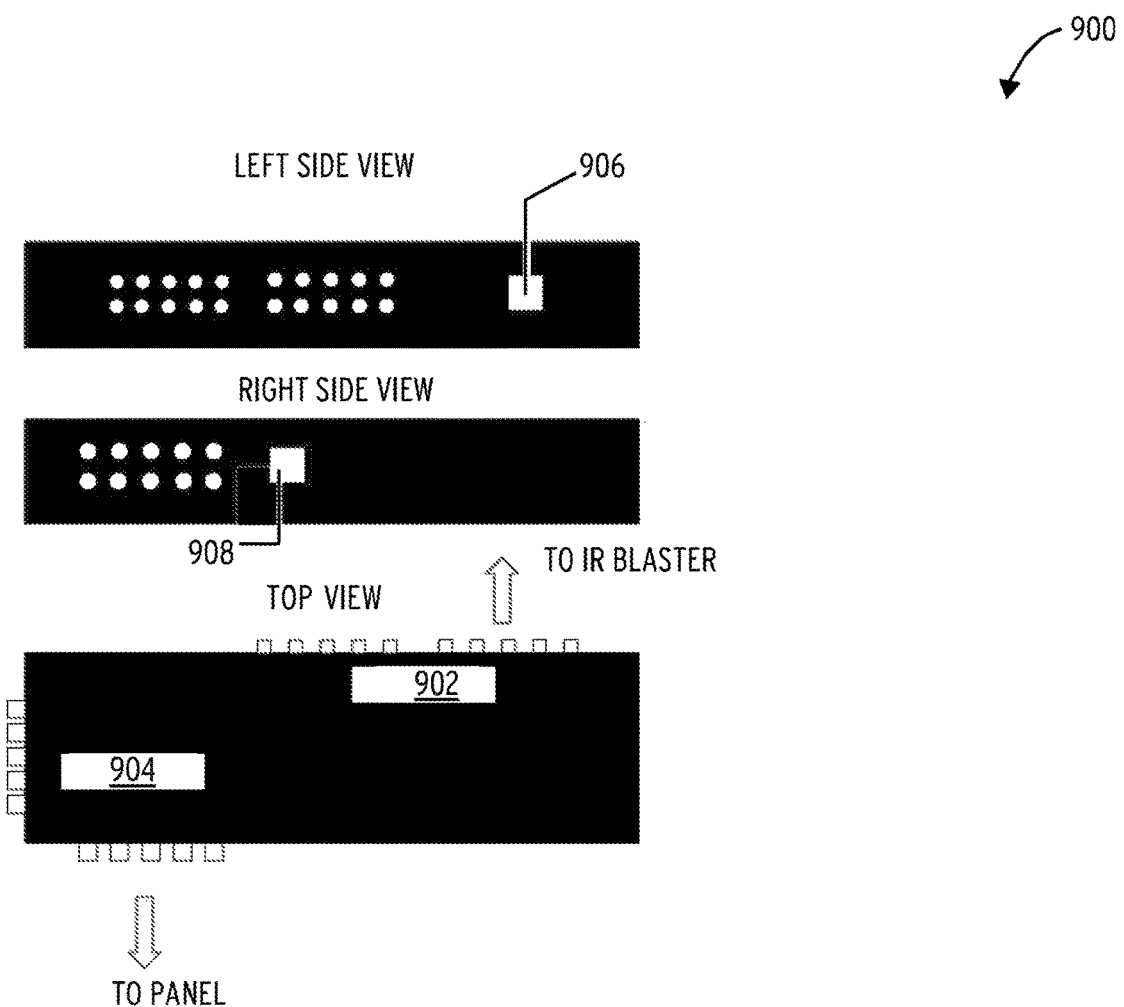
FIG. 9 illustrates a video hardware unit 900 in accordance with one embodiment.

FIG. 9 illustrates a left side view, right side view, and top view of a video hardware unit 900. These views illustrate the 3.5 mm connectors 902 to the IR blaster 510, RCA connector 904 to the panel, AC connector 906, and Ethernet connector 908.

Figure 10:
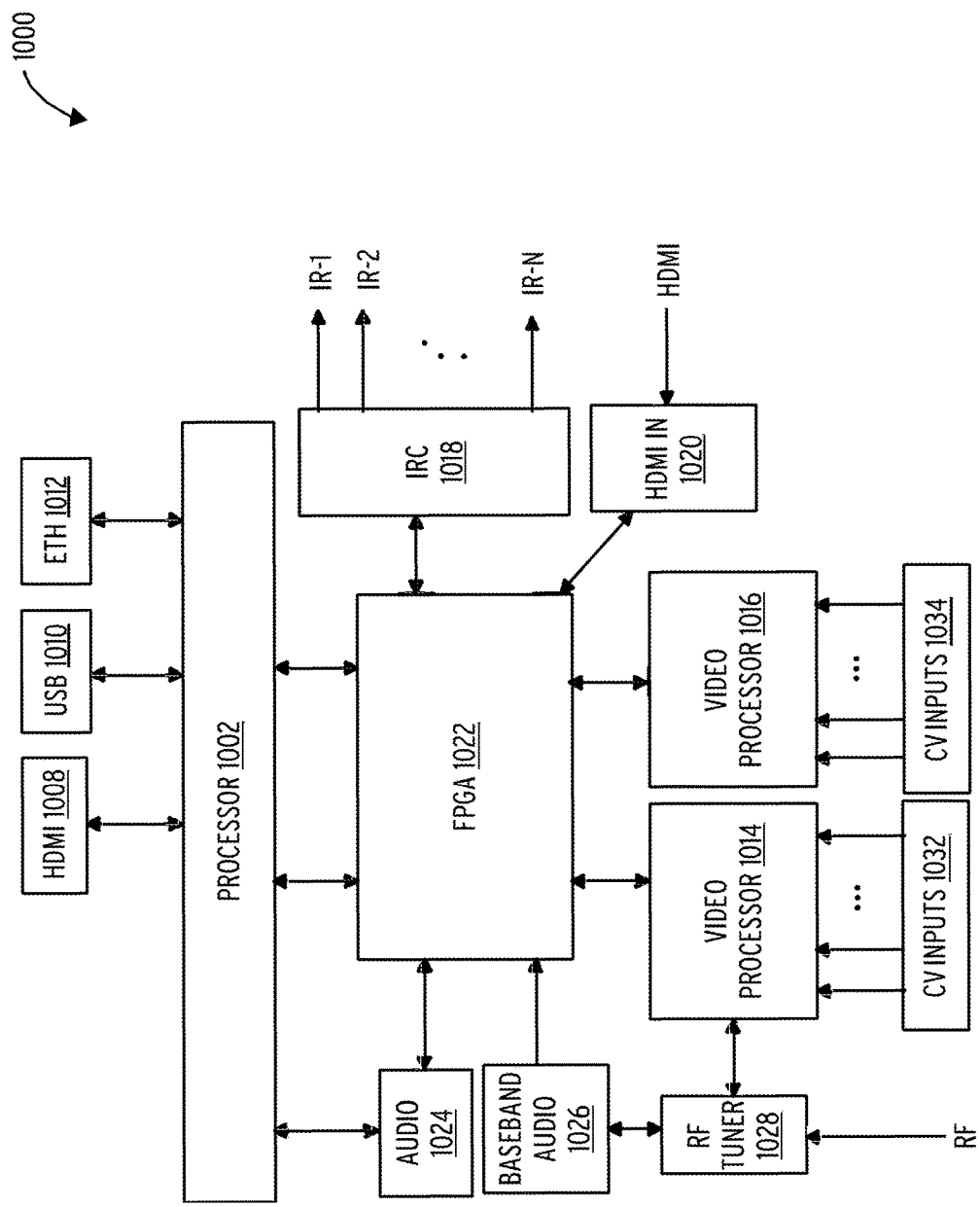
FIG. 10 illustrates an audio/video processing device 1000 in accordance with one embodiment.

Referring to FIG. 10, a distributed quality test system 100 includes various components that interoperate with one another using a master controller 1022, which may in one embodiment be implemented as an FPGA (Field Programmable Gate Array). The audio/video processing device 1000 may comprise additional components which are not shown as they would be readily understood to be included or optionally included by those of relevant skill in the art.

The distributed quality test system 100 includes a processor 1002 (e.g., a general purpose data processor), a video processor 1014, and a video processor 1016. Although two video processors are illustrated, other embodiments of the audio/video processing device 1000 may utilize more than two video processors.

The video processor 1014 and the video processor 1016 each operate an RF tuner 1028 to extract selected RF channels from an input RF broadband signal (e.g., comprising multiple QAM channels). A baseband audio processor 1026 extracts audio for the selected RF channels. The video processor 1014 and the video processor 1016 operate on video from the RF channels, and an audio processor 1024 operates on the audio from the RF channels. The video processor 1014 and video processor 1016 also operate on a plurality of composite video inputs 1032 and composite video inputs 1034 from the UUTs in the quality test rack 500.

An additional input of HDMI audio and video to the audio/video processing device 1000 may be provided via the HDMI input controller 1020.

In coordination with the master controller 1022, the processor 1002 executes the UUT test 122 received from the server test system 404 and operates various components of the audio/video processing device 1000 to test a plurality of UUTs in the quality test rack 500. Components operated by the processor 1002 to execute and report results of the UUT test 122 include IR output controller 1018, Ethernet I/O controller 1012, USB I/O controller 1010, RF tuner 1028, video processor 1014, video processor 1016, and audio processor 1024.

The IR output controller 1018 may interoperate with the other system components via the master controller 1022 using, for example, an SPI serial interface, The IR output controller 1018 may output IR control signals to the UUTs in the quality test rack 500 in both serialized and parallel output modes of operation. The IR output controller 1018 may also be operable to control the tower lamp 506.

The HDMI input controller 1020 may interface and interoperate with the master controller 1022 via a serial I2C interface. The HDMI input controller 1020 may operate in combination with internal or external external HDMI switch controller 1008 to process HDMI inputs from the UUTs installed on the quality test rack 500. The input HDMI may supplement or replace the composite video inputs 1032 and composite video inputs 1034 for purposes of executing the UUT test 122. The RF tuner 1028 and baseband audio processor 1026 may be operated in coordinated fashion to select RF channels from the UUTs for testing. The RF tuner

1028 may interface via an I2C interface and may utilize an RF switch (not illustrated) to select RF inputs from the UUTs. The RF tuner 1028 inputs may supplement or replace the composite video inputs 1032, composite video inputs 1034, and/or HDMI inputs when executing the UUT test 122.

Execution of the UUT test 122 by the audio/video processing device 1000 produces the test results 124 that are communicated to the server test system 404 via one or more of the USB I/O controller 1010 or Ethernet I/O controller 1012.

Figure 11:
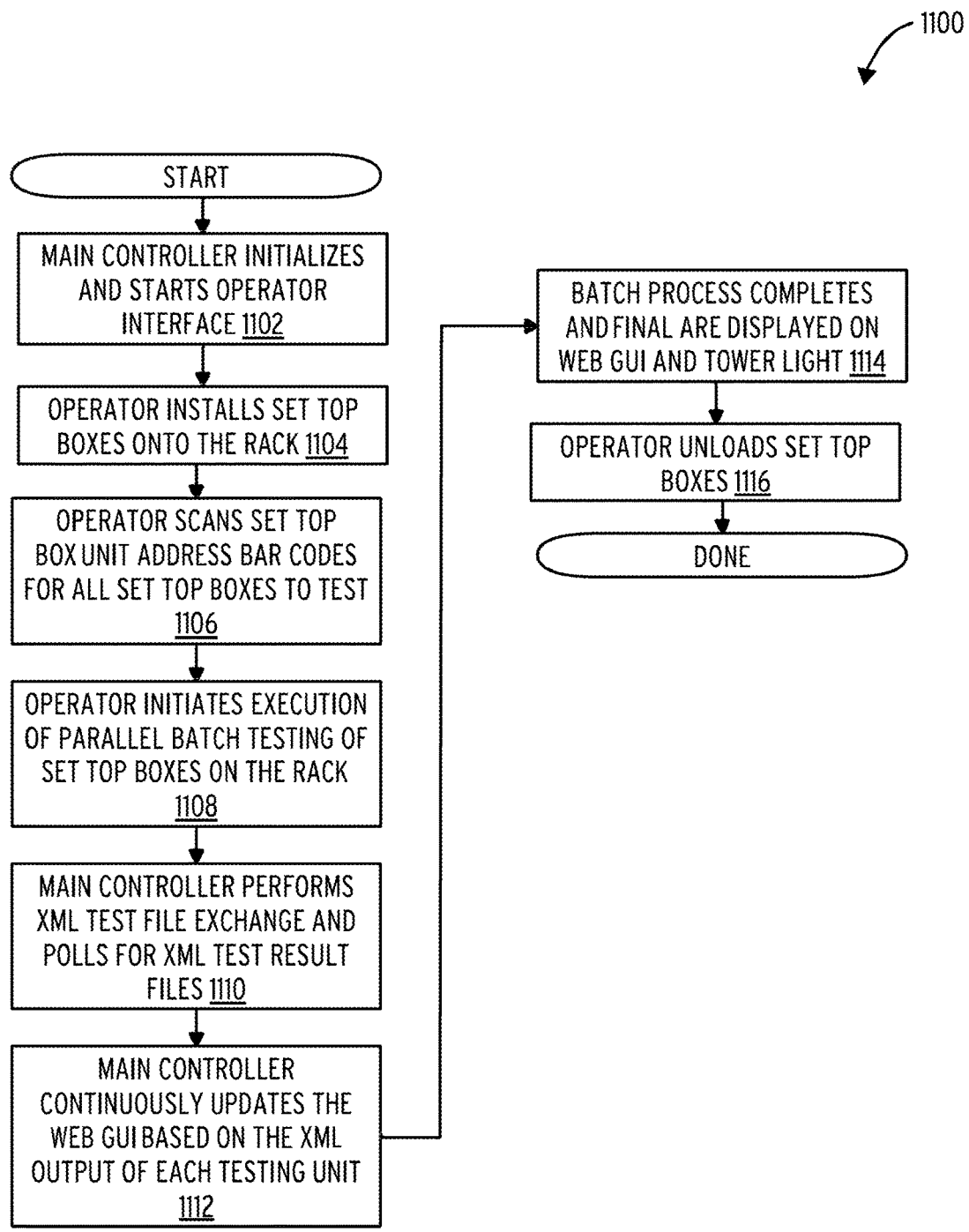
FIG. 11 illustrates a quality test process 1100 in accordance with one embodiment.

Referring to FIG. 11, a quality test process 1100 is started and a main controller initializes and starts up an operator interface (block 1102). The operator installs a batch of set top boxes on a rack test system (block 1104). The operator scans the serial unit address bar codes of all the set top boxes (block 1106) and initiates execution of parallel batch testing of the set top boxes (block 1108).

The main controller downloads to the XML test files to the slave controllers on the rack and the slave controllers carry out the tests on the set top boxes. The main controller polls for results of these tests, e.g. in a predetermined file system directory or directly to the slave controllers. See block 1110.

The main controller continually updates a web GUI with test results from the slave controllers (block 1112), and eventually the batch testing completes (block 1114) and the operator unloads the set top boxes from the rack (block 1116).

Figure 12:
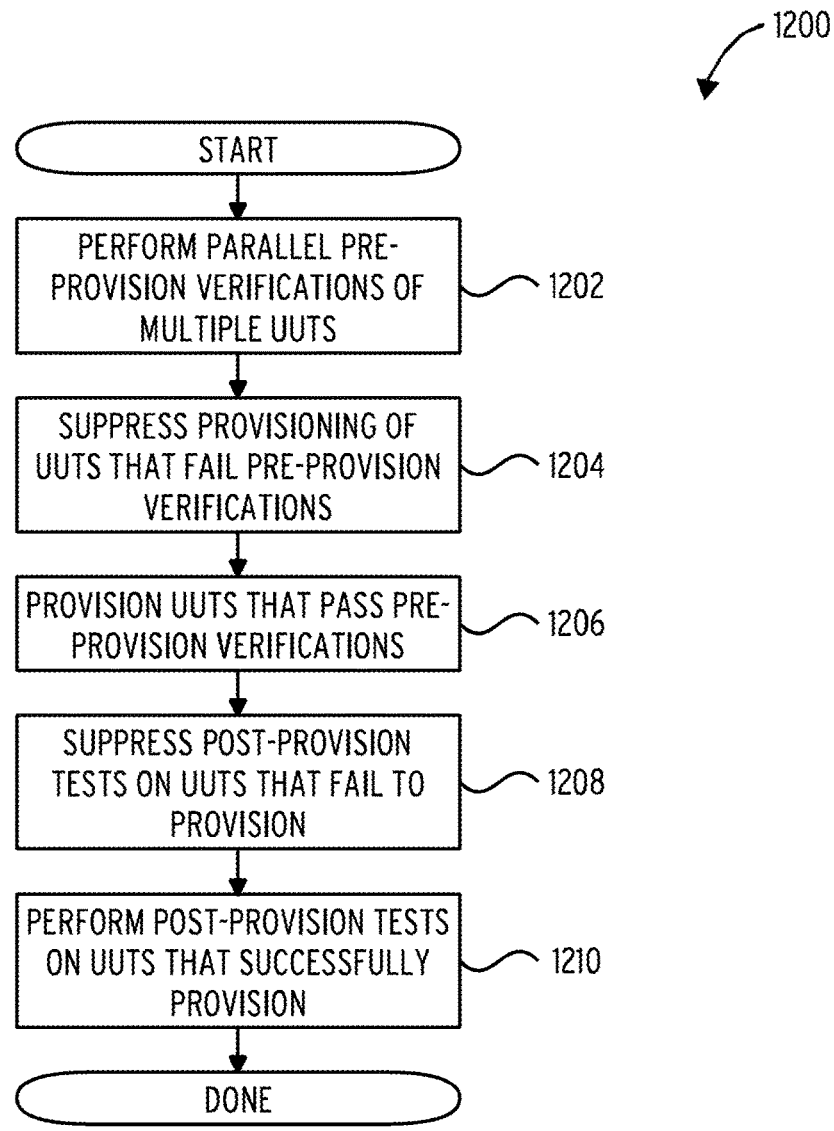
FIG. 12 illustrates a multi-unit test process 1200 in accordance with one embodiment.

Referring to FIG. 12, a multi-unit test process 1200 starts and performs parallel pre-provision verifications of multiple UUTs (block 1202). Provisioning is suppressed for those UUTs that fail the pre-provisioning verifications (block 1204). UUTs that pass pre-provision verifications are provisioned (block 1206). Post-provision tests are suppressed on UUTs that fail to provision (block 1208). Those that provision successfully are tested further (block 1210).

Figure 13:
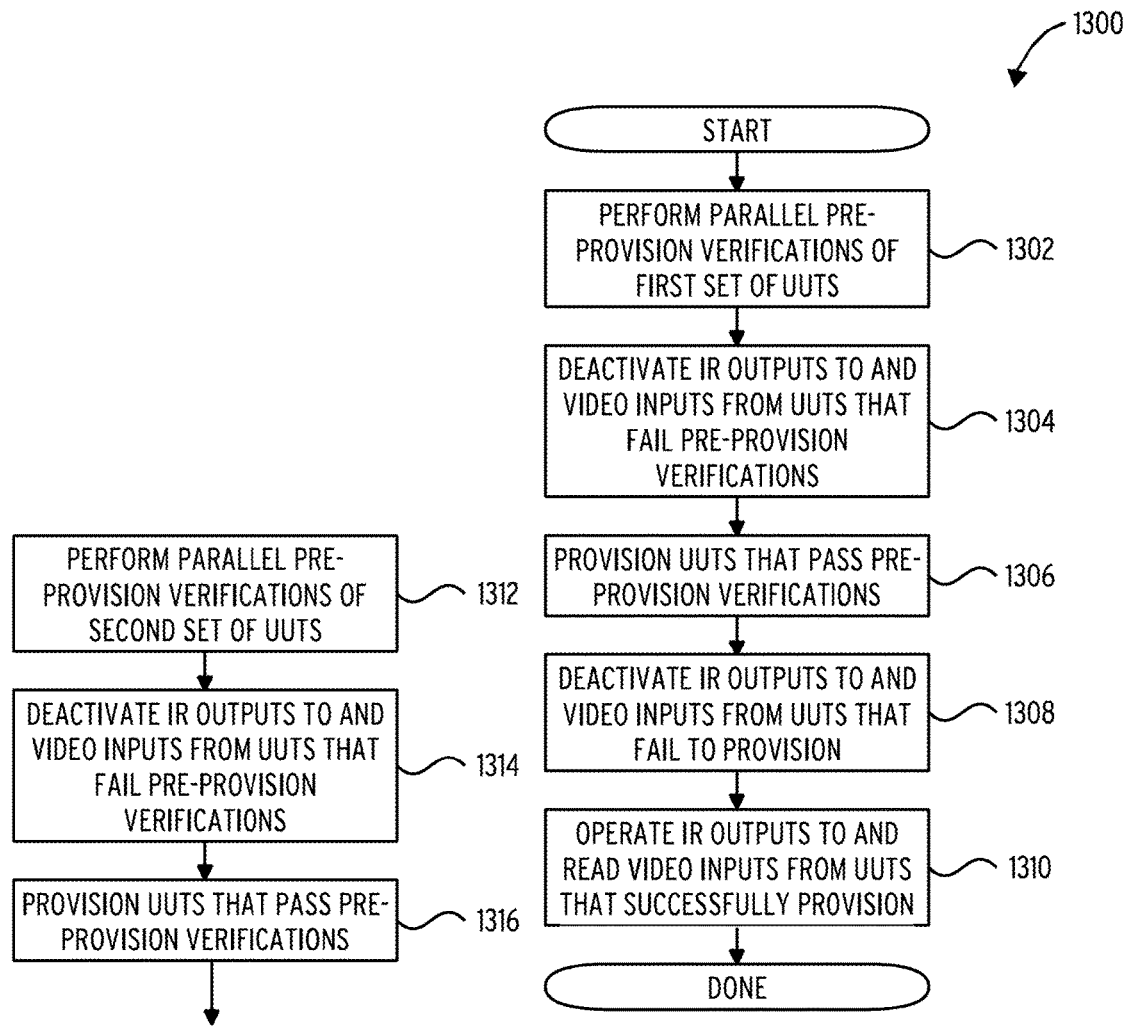
FIG. 13 illustrates a multi-unit test process 1300 in accordance with one embodiment.

Referring to FIG. 13, a multi-unit test process 1300 starts and performs parallel pre-provision verifications of a first set of UUTs (block 1302). Provisioning is suppressed for those UUTs that fail the pre-provisioning verifications (block 1304). UUTs that pass pre-provision verifications are provisioned (block 1306). Post-provision tests are suppressed on UUTs that fail to provision (block 1308). Those that provision successfully are tested further (block 1310).

The multi-unit test process 1300 performs parallel pre-provision verifications of a second set of UUTs (block 1312) during the provisioning of UUTs in the first set that pass pre-provision verifications (block 1306). Provisioning is suppressed for those UUTs of the second set that fail the pre-provisioning verifications (block 1314). At block 1316 UUTs of the second set that pass pre-provision verifications are provisioned in parallel with testing the UUTs from the first set that successfully provision (block 1310). The testing of the UUTs in the second set then proceeds as for the testing of the UUTs in the first set. Parallel testing of UUTs in a third set may then commence in parallel with testing of the UUTs in the first set and UUTs in the second set, in like fashion.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method for operating a video hardware unit for testing and provisioning a plurality of end-user devices,
   receiving, at the video hardware unit, the identifying information associated with each of a plurality of end-user devices connected to the video hardware unit;
   obtaining, from a main controller, test parameters associated with each of the plurality of end user devices, the test parameters being determined by the main controller using the identifying information associated with each of the plurality of end-user devices;
   performing, at the video hardware unit, pre-provision first tests on a first subset of end-user devices of the plurality of end-user devices;
   determining, at the video hardware unit, which end-user devices of the first subset of end-user devices passed the pre-provision tests;
   suppressing, at the video hardware unit, provisioning by a headend controller of end-user devices of the first subset of end user devices that did not pass the pre-provision tests; and
   performing, at the video hardware unit, post-provision tests on a second subset of end-user devices of the plurality of end-user devices, the second subset of end-user devices comprising end-user devices that passed the pre-provision tests and were successfully provisioned by the headend controller.

2. The method of claim 1, wherein testing comprise pre-provision verifications and post-provision tests.

3. The method of claim 1, further comprising the step of using the identifying information to retrieve a Unit Under Test (UUT) test describing the test to be performed on each of the end-user devices.

4. The method of claim 1, wherein the end-user devices comprise cable modems.

5. The method of claim 1, wherein the end-user devices comprise set top boxes.

6. A method for operating a video hardware unit to perform parallel testing and provisioning of a plurality of end-user devices,
   receiving, at a video hardware unit, identifying information associated with each of a plurality of end-user devices connected to the video hardware unit for testing;
   obtaining, from a main controller, test parameters associated with the plurality of end user devices, the test parameters being determined by the main controller using the identifying information associated with each of the plurality of end-user devices;
   assigning, at the video hardware unit, the end-user devices into a first subset of end-user devices and a second subset of end-user devices;
   performing, at the video hardware unit, pre-provision verification on the first subset of end-user devices;
   determining, at the video hardware unit, which end-user devices of the first subset of end-user devices passed the pre-provision verification;
   initiating, at the video hardware unit, provisioning by a headend controller of the end-user devices of the first subset of end-user devices that passed the pre-provision verification; and
   performing, at the video hardware unit, pre-provision verification on the second subset of end-user devices simultaneously with the provisioning of the end-user devices that passed the pre-provision verification.

7. The method of claim 6, wherein the pre-provision verification of the second subset of end-user devices is performed while the end-user devices of the first subset of end-user devices that passed the pre-provision verification are provisioned.

8. The method of claim 6, further comprising the step of performing post-provision tests on end-user devices that are provisioned by the headend controller.

9. The method of claim 6, further comprising the step of using the identifying information to retrieve a Unit Under Test (UUT) test describing the test to be performed on each of the end-user devices.

10. The method of claim 6, wherein the end-user devices comprise cable modems.

11. The method of claim 6, wherein the end-user devices comprise set top boxes.

12. A test system for testing a plurality of end-user devices, comprising:

a test rack; and a controller connected to the test rack and connectable to a plurality of end-user devices, wherein the test rack is configured to receive the plurality of end-user devices, and the controller is configured to divide the plurality of end-user devices into a first subset of end-user devices and a second subset of end-user devices, perform pre-provision verifications on the first subset of end-user devices, determine which end-user devices of the first subset of end-user devices passed the pre-provision verifications, suppress provisioning of the end-user devices of the first subset of end-user devices that failed the pre-provision verification, and perform pre-provision verifications on the second subset of end-user devices.

13. The test system of claim 12, wherein the pre-provision verification of the second subset of end-user devices is performed simultaneously with the provisioning of the end-user devices of the first subset of end-user devices that passed the pre-provision verification.

14. The test system of claim 12, wherein provisioning comprises initializing and downloading software to an end-user device.

15. The test system of claim 12, wherein the controller is further configured to perform post-provision tests on end-user devices that are provisioned.

16. The test system of claim 12, further comprising the step of using the identifying information to retrieve a Unit Under Test (UUT) test describing the test to be performed on each of the end-user devices.

17. The test system of claim 12, wherein the end-user devices comprise cable modems.

18. The test system of claim 12, wherein the end-user devices comprise set-top boxes.

* * * * *